US008264540B2

(12) United States Patent
Chang et al.

(10) Patent No.: US 8,264,540 B2
(45) Date of Patent: Sep. 11, 2012

(54) BIDIRECTIONAL WIRELESS TRANSMISSION AND COMMUNICATION SYSTEM

(75) Inventors: Sheng-Hsiung Chang, Taipei County (TW); Sheng-Yuan Chang, Taipei County (TW)

(73) Assignee: Taiwan Gomet Technology Co. Ltd., Taipei County (TW)

( * ) Notice: Subject to any disclaimer, the term of this patent is extended or adjusted under 35 U.S.C. 154(b) by 409 days.

(21) Appl. No.: 12/607,836

(22) Filed: Oct. 28, 2009

(65) Prior Publication Data

US 2010/0110191 A1 May 6, 2010

Related U.S. Application Data

(60) Provisional application No. 61/109,517, filed on Oct. 30, 2008, provisional application No. 61/115,557, filed on Nov. 18, 2008.

(51) Int. Cl.
*H04B 7/00* (2006.01)
*H04N 7/18* (2006.01)

(52) U.S. Cl. .......................................... 348/148; 455/68

(58) Field of Classification Search .......... 348/148–152; 455/68

See application file for complete search history.

(56) References Cited

U.S. PATENT DOCUMENTS

| | | | | |
|---|---|---|---|---|
| 6,532,360 | B1 * | 3/2003 | Shaffer | 455/404.1 |
| 7,046,140 | B2 * | 5/2006 | Adamczyk et al. | 340/539.18 |
| 7,630,737 | B2 * | 12/2009 | Pande et al. | 455/556.1 |
| 2007/0129022 | A1 * | 6/2007 | Boillot et al. | 455/90.1 |
| 2007/0135148 | A1 * | 6/2007 | Daniels et al. | 455/502 |
| 2008/0144788 | A1 * | 6/2008 | You et al. | 379/93.15 |

* cited by examiner

*Primary Examiner* — Moustafa M Meky

(74) *Attorney, Agent, or Firm* — WPAT, P.C.; Anthony King

(57) ABSTRACT

A bidirectional wireless transmission and communication system is disclosed, including a base station, a wireless microphone and an external control device. A bidirectional wireless transmission and communication may be performed between the wireless microphone and the base station. The external control device is connected to the wireless microphone wirelessly or via a cable for controlling the wireless microphone via at least one push button on the external control device. The external control device is also provided with at least one light-emitting element to show the function operating state of the wireless microphone. The wireless microphone is internally provided with a global positioning system and a G-sensor for locating the coordinates of the wireless microphone under different situations. When the wireless microphone is located beyond the wireless communication range, the wireless microphone emits a high-power pulsed radio frequency signal for the base station to locate the position of the wireless microphone.

5 Claims, 5 Drawing Sheets

BIDIRECTIONAL WIRELESS TRANSMISSION AND COMMUNICATION SYSTEM

FIELD OF THE INVENTION

The present invention relates to a bidirectional wireless transmission and communication system, and more particularly to a wireless microphone operable via an external control device or a wireless microphone comprising a G-sensor and capable to emit a high-power pulsed radio frequency (RF) signal as a position indicator.

BACKGROUND OF THE INVENTION

It is very often policemen or firemen on duty get injured or attacked at criminal scene or accident site. To ensure the safety of policemen and firemen on duty, and to accurately record the original criminal scene to avoid any future dispute, the US Police has adopted the in-car video system for policemen to record the process of law enforcement for use as evidence.

The currently commercially available wireless microphone for using with a police in-car video system includes a police wireless microphone, a wireless base station, and a video recording device or a digital video recorder (DVR) computer. The police wireless microphone is able to transmit digital data, such as audio signals, position coordinates or images from a remote location to the wireless base station. The data are further transmitted to a soundtrack of the DVR computer and recorded as a video file stored on an encrypted computer or database hard disk under protection.

According to the responses from policemen who have the experience in using the conventional police wireless microphone for many years, the conventional police wireless microphone has the following disadvantages:

(1) The policemen or the firemen on duty usually wear the wireless microphone on their waist or put in a pocket, so that they may conveniently use the wireless microphone in performing their task. However, the police wireless microphone is also frequently covered by the user's heavy coat or raincoat in the winter or on rainy days, or by the user's bulletproof vest, preventing the user from quickly turning on and operating various functions of the wireless microphone.

(2) When a policeman or a fireman enters into a building with complicated internal structure or moves to a location out of the wireless signal receiving range in performing his task, the wireless microphone worn by the policeman or the fireman might fail to receive wireless signals or could only receive discontinuous wireless signals. Under this condition, not all the contents of the communication between the wireless microphone and the base station may be completely recorded. While the conventional wireless microphone is equipped with the digital recorder function to record important evidences, the recorded evidences is subject to lose if the wireless microphone is damaged or lost in a criminal scene when the policeman fights with a gangster.

(3) Some of the police wireless microphones are equipped with the global positioning system (GPS) function, so that the position coordinates of the policeman wearing the wireless microphone and moved away from the police car may be continuously sent back to the base station. However, in the event the policeman wears or puts the wireless microphone at an unsuitable position, or when the wireless microphone is undesirably covered or shielded by, for example, the user's body, a building or a big tree, it is very possible the wireless microphone loses its GPS function. Under this condition, while the wireless microphone may still transmit data back to the base station, persons at the base station would not be able to locate the user's exact position without the help of the GPS. In some worse conditions, the policeman or the fireman getting injured in the site could not be timely rescued because the base station fails to locate his position.

(4) There are chances the policeman on duty is accidentally hit by a car or attacked by a scoundrel, and the policeman does not have enough time to use the wireless microphone to remotely turn on the in-car video system on the police car. As a result, no evidence is recorded.

(5) There are also chances the policeman driving the police car to chase a gangster and moving beyond the transmission distance of the wireless microphone is badly injured and becomes unconscious. Since the injured policeman has moved beyond the communication distance of the wireless microphone, the injured policeman may be not timely rescued because the supporting persons fail to locate his accurate position.

SUMMARY OF THE INVENTION

In view of the aforementioned problems of the prior art, a primary object of the present invention is to provide a bidirectional wireless transmission and communication system to avoid the inconvenient operation when the wireless microphone is hindered by a user's heavy coat or bulletproof vest.

A second object of the present invention is to provide a bidirectional wireless transmission and communication system to find the position of a wireless microphone when a global positioning system of the wireless microphone fails to provide positioning coordinates.

A third object of the present invention is to provide a bidirectional wireless transmission and communication system to find the position of a wireless microphone when the wireless microphone is beyond the bidirectional wireless transmission and communication range.

A fourth object of the present invention is to provide a bidirectional wireless transmission and communication system to complete communication contents when the bidirectional wireless transmission and communication has been interrupted.

To achieve the primary object, the bidirectional wireless transmission and communication system according to the present invention comprises a base station, a wireless microphone, and an external control device. The base station comprises a base-station wireless transceiver module. The wireless microphone comprises a wireless transceiver module, a voice processing module, a storage device, and a microcontroller. The wireless transceiver module performs a bidirectional wireless communication with the base-station wireless transceiver module. The voice processing module receives a sound signal around the wireless microphone or outputs a sound signal transmitted from the base station. The storage device stores the received sound signal or the sound signal transmitted from the base station. The microcontroller is connected to the wireless transceiver, the voice processing module and the storage device, and converts the received sound signal into a radio-frequency (RF) signal for transmitting to the base station wirelessly. The external control device is capable of performing a communication with the wireless microphone and comprises at least one light-emitting element and at least one push button. Pushing each of the button or the pushing time period of each of the button correspond to control one of the plurality of operating functions of the wireless microphone to switch the wireless microphone among the different operating functions. Different lighting conditions of the light-emitting element correspondingly indicate different states of the plurality of operating functions of the wireless microphone.

To achieve the second object, the bidirectional wireless transmission and communication system according to the present invention is to solve the problem of failing to track the position of a wireless microphone due to weak satellite signals. The bidirectional wireless transmission and communication system comprises a base station and a wireless microphone. The base station comprises a base-station wireless transceiver module. The wireless microphone comprises a wireless transceiver module, a voice processing module, a storage device, a microcontroller, and a G-sensor. The wireless transceiver module performs a bidirectional wireless communication with the base-station wireless transceiver module. The voice processing module receives a sound signal around the wireless microphone or outputs a sound signal transmitted from the base station. The storage device stores the received sound signal or the sound signal transmitted from the base station. The microcontroller is connected to the wireless transceiver, the voice processing module and the storage device, and converts the received sound signal into a radio-frequency (RF) signal for wirelessly transmitting to the base station. The G-sensor is connected to the microcontroller for measuring a phase or an acceleration change of the wireless microphone. When the measured acceleration change exceeds a threshold, a recording function of the wireless microphone is automatically actuated, and an in-car video system at the base station is also actuated to proceed with video or audio recording.

To achieve the third object, the bidirectional wireless transmission and communication system according to the present invention is to solve the problem of failing to track the position of a wireless microphone that is moved beyond the wireless communication range. The bidirectional wireless transmission and communication system comprises a base station and a wireless microphone. The base station comprises a base-station wireless transceiver module. The wireless microphone comprises a wireless transceiver module, a voice processing module, a storage device, a microcontroller, and an emergency button. The wireless transceiver module performs a bidirectional wireless communication with the base-station wireless transceiver module. The voice processing module receives a sound signal around the wireless microphone or outputs a sound signal transmitted from the base station. The storage device stores the received sound signal or the sound signal transmitted from the base station. The microcontroller is connected to the wireless transceiver, the voice processing module and the storage device, and converts the received sound signal into a radio-frequency (RF) signal for transmitting to the base station wirelessly. The emergency button is connected to the microcontroller. When the wireless microphone is located beyond a communication range of the base station and the emergency button is pushed, the wireless transceiver module may emits a high-power pulsed radio frequency (RF) signal as a position indicator to help another police find out this wireless microphone owner's position.

To achieve the fourth object, the bidirectional wireless transmission and communication system according to the present invention is to solve the problem of failing to obtain complete communication contents when the bidirectional wireless transmission between a wireless microphone and a base station has been interrupted. The bidirectional wireless transmission and communication system comprises a base station and a wireless microphone. The base station comprises a base-station wireless transceiver module. The wireless microphone comprises a wireless transceiver module, a voice processing module, a storage device, and a microcontroller. The wireless transceiver module performs a bidirectional wireless communication with the base-station wireless transceiver module. The voice processing module receives a first sound signal around the wireless microphone or outputs a second sound signal transmitted from the base station. The storage device stores the first sound signal or the second sound signal transmitted from the base station. The microcontroller is connected to the wireless transceiver, the voice processing module and the storage device, and converts the first sound signal into a radio-frequency (RF) signal for transmitting to the base station wirelessly. When bidirectional wireless communication between the base station and the wireless microphone is performed, the base station creates a base-station backup data stored on a computer and database connected to the base station for recording the first sound signal and the second sound signal. The wireless microphone also creates a wireless microphone backup data stored on the storage device for recording the first sound signal and the second sound signal. When the bidirectional wireless communication between the base station and the wireless microphone is interrupted and resumes later, the wireless microphone immediately transmits the content of the wireless microphone backup data within the interrupted time period to the base station to thereby complete the base-station backup data.

With the above arrangements, the bidirectional wireless transmission and communication system of the present invention provides the following advantages:

(1) The external control device enables a user to easily and quickly control the wireless microphone and switch the wireless microphone among different operating modes.

(2) The user may follow the operating state of the wireless microphone via different lighting conditions of the light-emitting elements on the external control device.

(3) In the event the GPS is blocked by an obstacle, the G-sensor of the wireless microphone serves as an aid to the GPS. Data sent by the G-sensor to the base station is calculated by a computer to thereby obtain the user's moving track as well as the user's distance and direction relative to the base station.

(4) The G-sensor built in the police wireless microphone may automatically actuate the police wireless microphone and an in-car video system at the base station to proceed with video and audio recording, ensuring that useful evidences may be saved when the policeman is unexpectedly injured on duty.

(5) When the wireless microphone is moved beyond the communication range, or when the GPS and the G-sensor fails to determine the position of the wireless microphone, the user may push the emergency button of the wireless microphone to emit a high-power pulsed radio frequency (RF) signal as a position indicator to help another police find out this wireless microphone owner's position.

(6) When the bidirectional wireless communication between the wireless microphone and the base station is interrupted and resumes later, the wireless microphone may transmit only the contents of the wireless microphone backup data within the interrupted time period to the base station to complete the base-station backup data and to insure the base-station database always keeps the most updated backup data.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 schematically shows the use of the bidirectional wireless transmission and communication system of the present invention with a video recording system equipped on a police car or a fire engine.

DETAILED DESCRIPTION OF THE PREFERRED EMBODIMENTS

Figure 1:
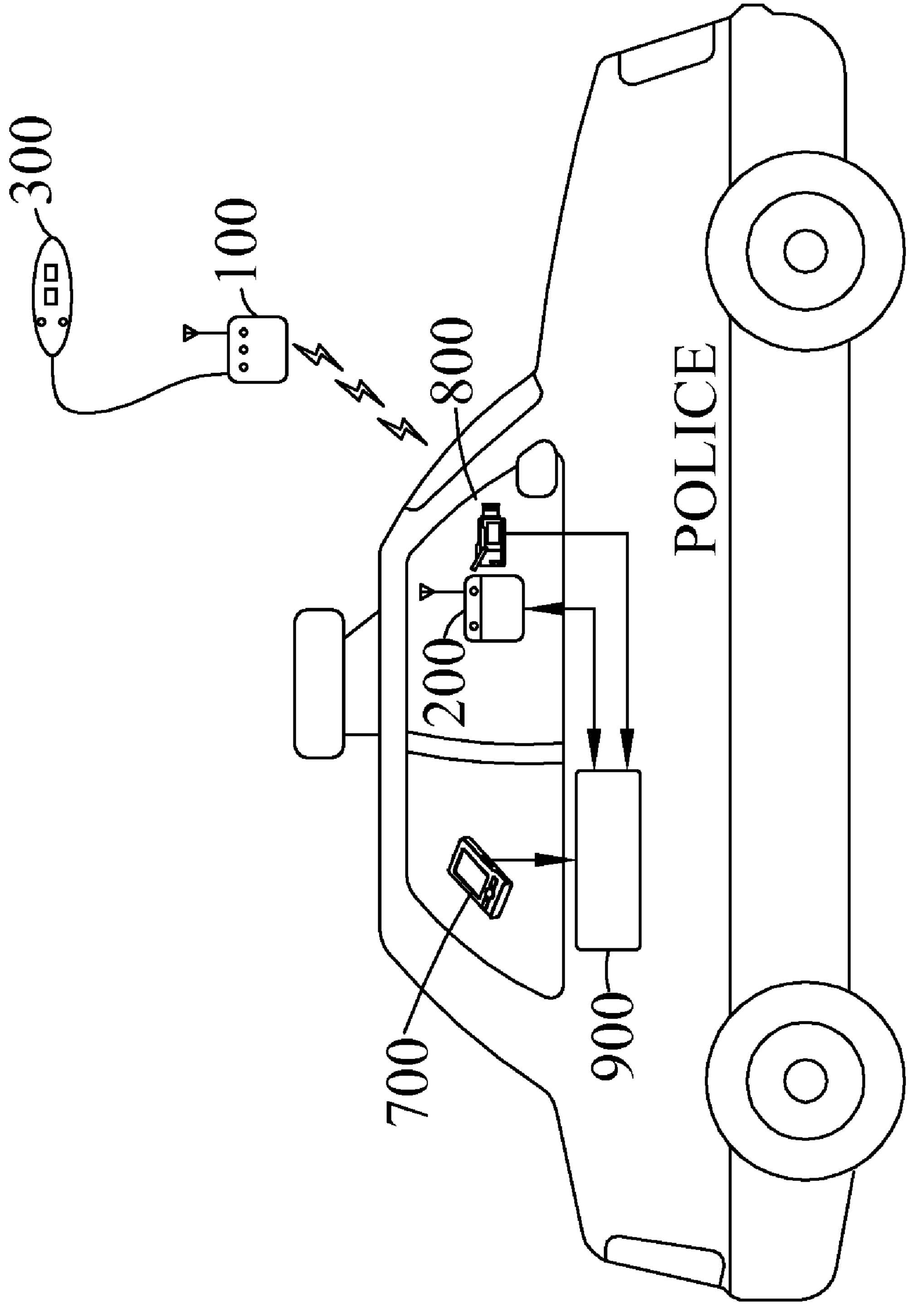

Please refer to FIG. 1 that schematically shows the use of a bidirectional wireless transmission and communication system of the present invention with a video recording system equipped on a police car or a fire engine. As shown, the bidirectional wireless transmission and communication system of the present invention comprises a wireless microphone 100, a base station 200, and an external control device 300. The present invention allows a bidirectional wireless transmission and communication between the wireless microphone 100 and the base station 200, and the external control device 300 may be connected to the wireless microphone 100 wirelessly or via a cable for controlling various operating functions of the wireless microphone 100 and displaying the different states of the operating functions of the wireless microphone 100. The base station 200 is disposed in, for example, a police car as shown in FIG. 1. The video recording system on the police car includes a base-station GPS 700, an in-car video system 800, and a computer and database 900. The computer and database 900 is connected to the base state 200 wirelessly or via a cable for storing all information having been wirelessly transmitted between the wireless microphone 100 and the base station 200. The computer and database 900 may be an apparatus with storage function, such as a computer having an image database or a memory. The computer and database 900 also provides the function of accessing a cabled or a wireless network to transmit or receive data, so as to extend the communication distance thereof. The in-car video system 800 is connected to the computer and database 900 for shooting images around the police car. The base-station GPS 700 is connected to the computer and database 900 for locating the position coordinates of the police car.

Figure 2:
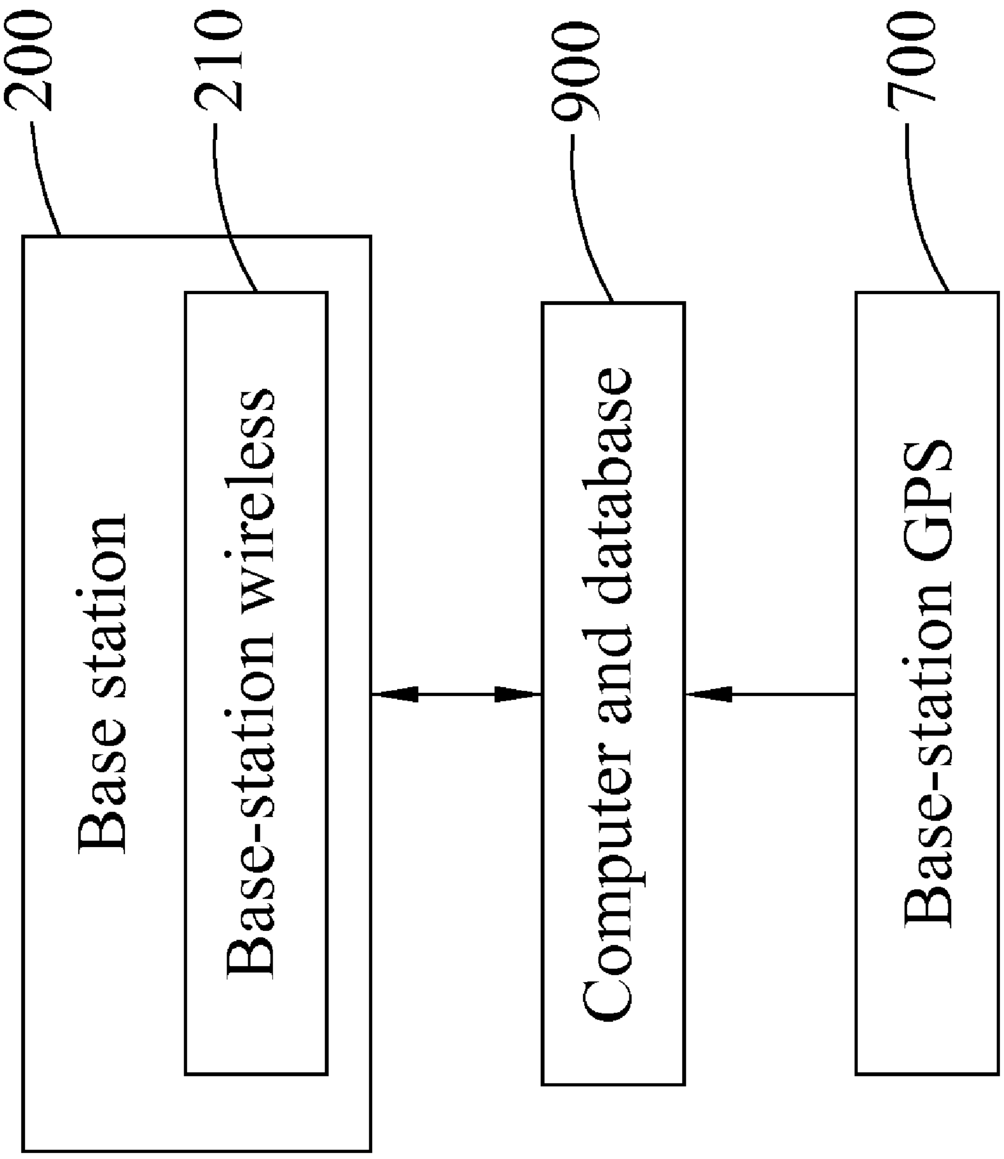
FIG. 2 is a block diagram of a first embodiment of the base station shown in FIG. 1.

Please refer to FIG. 2 that is a block diagram of a first embodiment of the base station 200 shown in FIG. 1. As shown, the base station 200 comprises a base-station wireless transceiver module 210. The bidirectional wireless communication between the base station 200 and the wireless microphone 100 is performed via the base-station wireless transceiver module 210. The base station 200 and the base-station GPS 700 are connected to the computer and database 900, and the computer and database 900 receives or transmits wireless signals via the base-station wireless transceiver module 210 to thereby enable bidirectional wireless transmission and communication with the wireless microphone 100.

Figure 3:
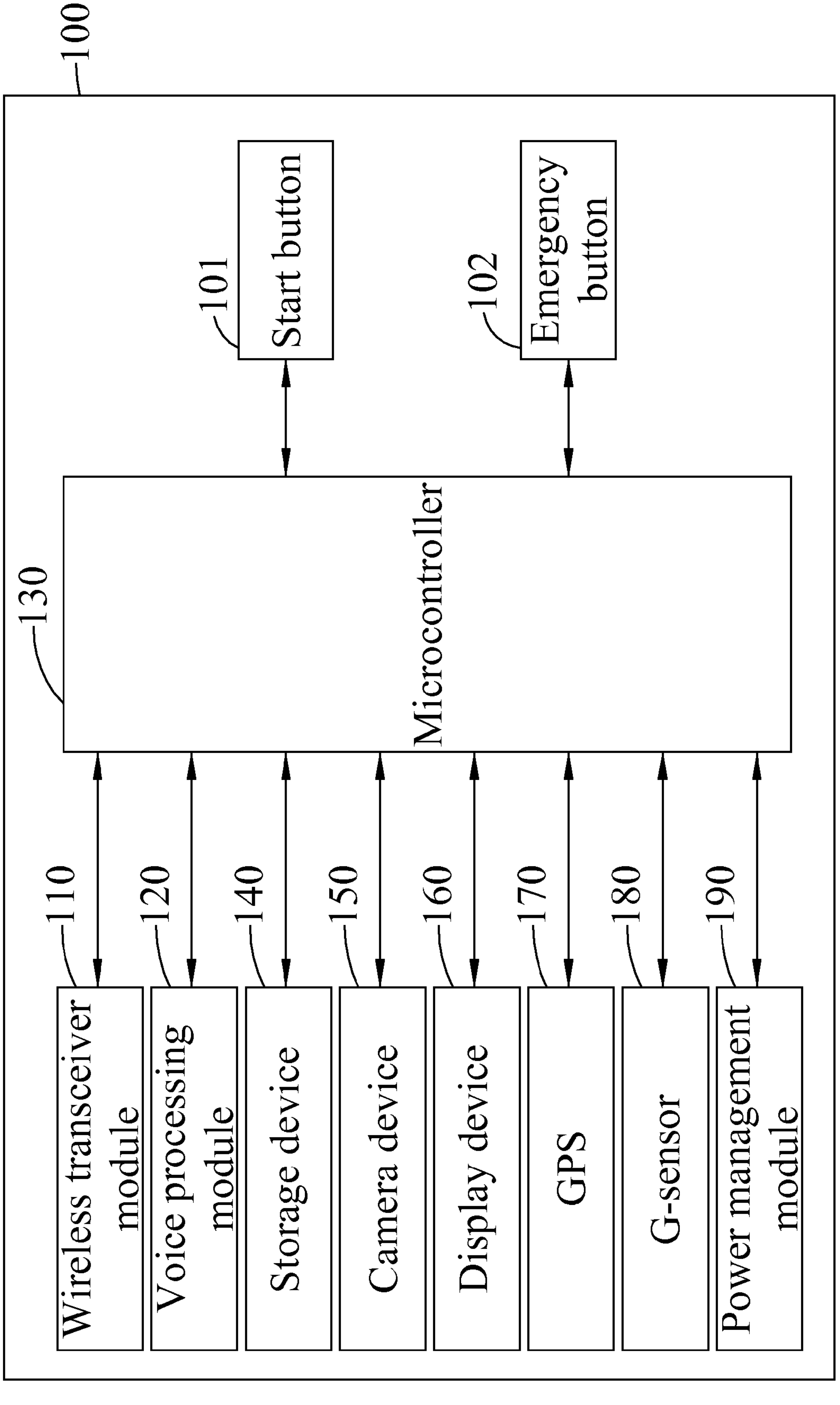
FIG. 3 is a block diagram of a first embodiment of the wireless microphone shown in FIG. 1.
Figure 4:
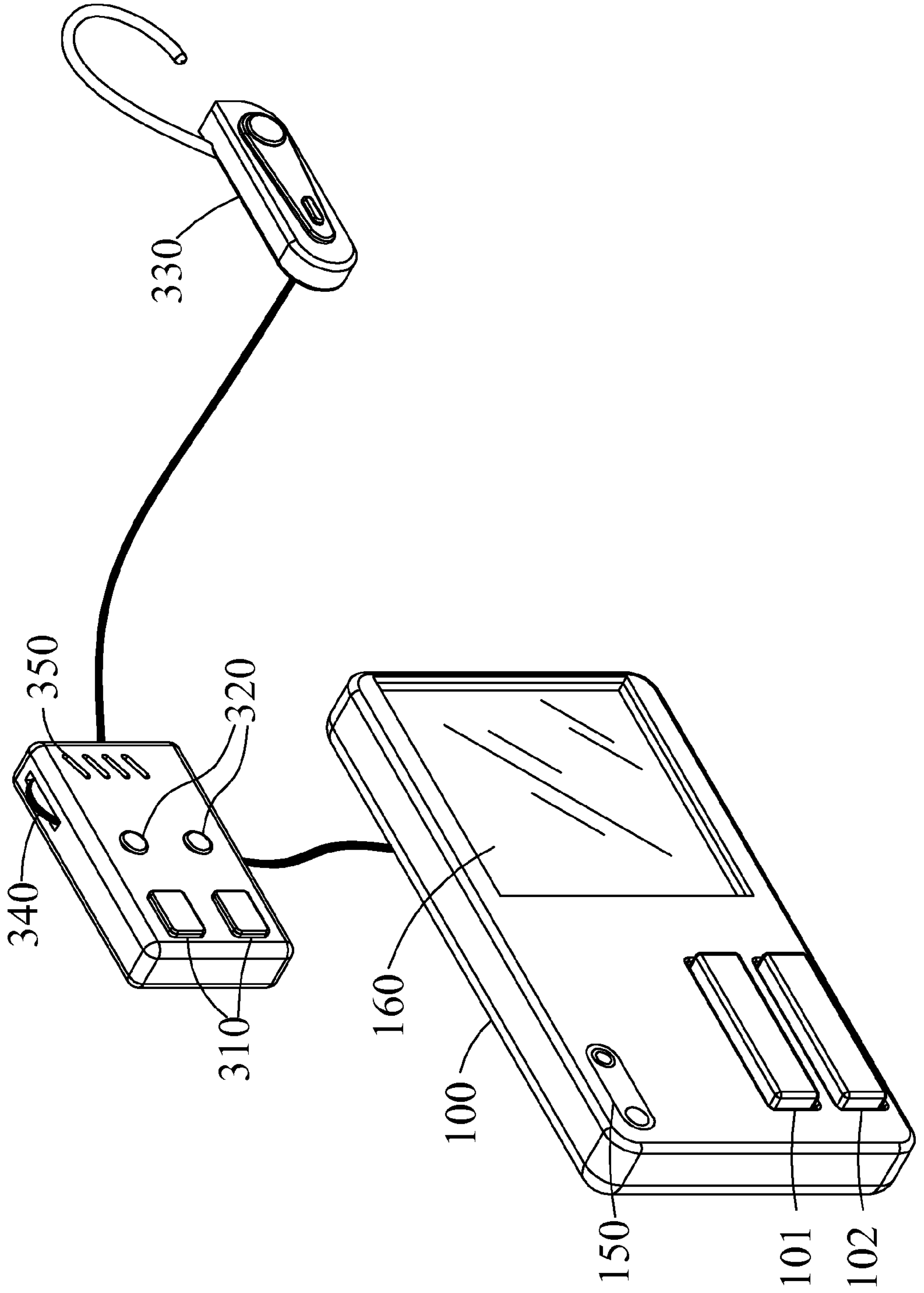
FIG. 4 is a schematic view showing a first embodiment of the external control device shown in FIG. 1.

FIG. 3 is a block diagram of a first embodiment of the wireless microphone 100 shown in FIG. 1, and FIG. 4 is a schematic view showing a first embodiment of the external control device 300 and the wireless microphone 100 shown in FIG. 1. Please refer to FIGS. 3 and 4 at the same time. The external control device 300 comprises two push buttons 310, two light-emitting elements 320, an earphone 330, an earphone volume control 340, and a microphone 350. The external control device 300 may be electrically connected to the wireless microphone 100 wirelessly or via a cable.

By pushing one of the two push buttons 310 on the external control device 300, a user may correspondingly control the whole or part of the operating functions of the wireless microphone 100. The two light-emitting elements 320 may indicate states of the operating functions of the wireless microphone 100.

When a policeman wears the wireless microphone 100 on the waist or puts the wireless microphone 100 in a pocket, from where the wireless microphone 100 is less easily operated, particularly when the wireless microphone 100 is covered by a heavy winter coat or a bulletproof vest, the policeman may directly operate the two push buttons 310 on the external control device 300 to quickly perform various operating functions of the wireless microphone 100. Further, the policeman may verify the current state of the operating function of the wireless microphone 100 from the lighting condition of the two light-emitting elements 320 on the external control device 300. For example, the policeman may observe whether the two light-emitting elements 320 are flashing or not, or observe the color of light emitted from the two light-emitting elements 320.

The earphone 330 of the external control device 300 is able to output a sound signal transmitted from the base station 200. The volume of the sound signal output by the earphone 330 may be regulated according to personal preference via the volume control 340. The microphone 350 is able to receive a sound signal around the wireless microphone 100.

As can be seen from FIG. 3, the wireless microphone 100 includes a start button 101, an emergency button 102, a wireless transceiver module 110, a voice processing module 120, a storage device 140, a microcontroller 130, a camera device 150, a display device 160, a GPS 170, a G-sensor 180, and a power management module 190.

The wireless transceiver module 110 is connected to the microcontroller 130. And, the bidirectional wireless communication between the wireless microphone 100 and the base-station wireless transceiver module 210 is performed via the wireless transceiver module 110.

The voice processing module 120 is connected to the microcontroller 130 for receiving a first sound signal around the wireless microphone 100 or outputting the second sound signal transmitted from the base station 200.

The storage device 140 is connected to the microcontroller 130 for storing the first sound signal, the second sound signal, and other data.

The microcontroller 130 converts the first sound signal received by the voice processing module 120 into a first radio-frequency (RF) signal, which is transmitted via the wireless transceiver module 110 to the base station 200.

The camera device 150 and the display device 160 are separately connected to the microcontroller 130. The camera device 150 is able to shoot pictures within a short distance. The pictures may be displayed on the display device 160 and transmitted to the base station 200, and be further transmitted to the computer and database 900 from the base station 200. At the computer and database 900, the pictures are subjected to image matching using image matching software, such as face recognition software. Any result from the image matching is transmitted back to the wireless microphone 100 for displaying on the display device 160 or sent a voice command to wireless microphone 100. For instance, the policeman may use the camera device 150 to shoot pictures of a suspicious person and wirelessly transmits the pictures to the computer and database 900 for image matching. The result from the image matching is transmitted back to the wireless microphone 100 to display on the display device 160 or sent a voice command to wireless microphone 100 for outputting the image matching result, so that the policeman may be informed whether the suspicious person has any criminal record.

The GPS 170 is connected to the microcontroller 130. When the wireless microphone 100 is turned on, the GPS 170 calculates its position to obtain the coordinates of the wireless microphone 100. The coordinates of the wireless microphone 100 are stored in the storage device 140 and transmitted to the base station 200 and the computer and database 900. And a moving track of the wireless microphone 100 after it is carried away from the police car may be obtained. The GPS 170 requires about 3 to 5 minutes from its actuation to the completion of position calculation thereof. Since the GPS 170 has relatively high power consumption and it is not suitable to turn on the GPS 170 all the time, the wireless microphone 100 is not able to record the coordinates within 3 to 5 minutes after it is turned on. The base-station GPS 700 on the police car may be actuated as soon as the car is started to thereby obtain the coordinates of the police car and current almanac data, which may be transmitted via the base station 200 to the just actuated GPS 170 of the wireless microphone 100 for use as a reference in starting the coordinate positioning by the GPS 170. Therefore, the time for the GPS 170 of the wireless microphone 100 to calculate and set the coordinates of the wireless microphone 100 may be shortened.

The G-sensor 180 is connected to the microprocessor 130 for measuring the phase or the acceleration change of the wireless microphone 100. In view that there is a relatively large error in the coordinates obtained by the GPS, the phase or the acceleration change of the wireless microphone 100 obtained by the G-sensor 180 are transmitted back to the base station 200, allowing the computer and database 900 to use these data as an aid to calculate the moving track of the wireless microphone 100 to accordingly obtain the relatively accurate coordinates and track of the wireless microphone 100. When a policeman or a fireman carrying the wireless microphone 100 enters a shelter or a building and the GPS 170 fails to provide the positioning function, the G-sensor 180 may still constantly measure the phase and the acceleration change of the wireless microphone 100 and continuously provides these data to the computer and database 900 for calculating the moving reference coordinates, with which supporting persons may quickly locate the policeman or the fireman in the shelter or building.

The G-sensor 180 keeps operating to analyze and monitor numeral values such as the phase or the acceleration change even when the wireless microphone 100 is in a standby mode. When a measured transient acceleration change exceeds a user-set threshold, the wireless microphone 100 is automatically actuated to remotely start the base state 200 and the in-car video system 800 to collect evidences via video recording. Meanwhile, the camera device 150 of the wireless microphone 100 is also actuated to shoot images around the policeman. For example, when the policeman on duty is unexpectedly hit by a car or attacked by someone and gets injured and falls, the phase and the acceleration change measured by the G-sensor 180 would exceed the threshold, and the microcontroller 130 automatically actuates the camera device 150 and transmits audio and image data captured by the camera device 150 to the computer and database 900 connected to the base station 200, so that evidences showing the accident are kept. Meanwhile, the base station 200 will actuate the in-car video system 800 and the computer and database 900, so as to video record and save evidences.

The power management module 190 is connected to the microcontroller 130 for supplying power needed by the wireless microphone 100 and controlling a power use state of the wireless microphone 100. When the bidirectional wireless transmission and communication between the wireless microphone 100 and the base station 200 is interrupted, or when the wireless microphone 100 is located beyond the range for the bidirectional wireless transmission and communication with the base station 200, the user may push the emergency button 102 for the microcontroller 130 to increase an output voltage of the power management module 190. With the increased output voltage, the wireless transceiver module 110 is able to emit a high-power pulsed radio frequency (RF) signal. This high-power pulsed RF signal is able to be received by a directional antenna or phase scanning antenna to locate the position and distance of the wireless microphone 100 relative to the base station 200. Once the wireless bidirectional transmission and communication between the base station 200 and the wireless microphone 100 resumes stable, the base station 200 controls the wireless microphone 100 to start transmitting sound to the base station 200 for monitoring sounds around the wireless microphone 100, allowing supporting persons to make correct decision.

Figure 5:
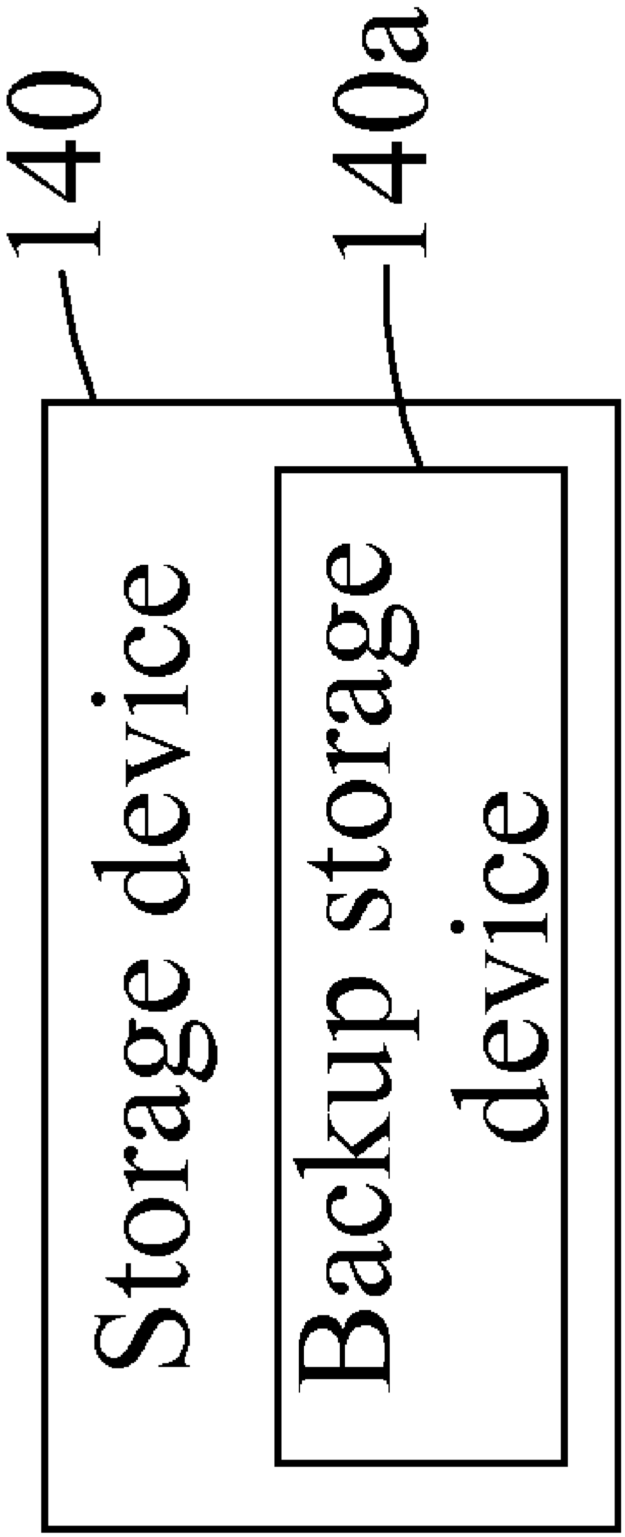
FIG. 5 is a block diagram of the storage device shown in FIG. 3.

FIG. 5 is a block diagram of the storage device 140 shown in FIG. 3. As shown, the storage device 140 further includes a backup storage device 140*a*. When the base station 200 and the wireless microphone 100 bi-directionally wireless sly communicate with each other, the base station 200 will create a base-station backup data in the computer and database 900 connected thereto, and the wireless microphone 100 will create a wireless microphone backup data in the backup storage device 140*a* thereof. The base-station backup data and the wireless microphone backup data on the wireless microphone 100 record the first sound signal and the second sound signal during the bidirectional wireless communication between the base station 200 and the wireless microphone 100.

When the wireless communication between the wireless microphone 100 and the base station 200 is blocked by a big-scale construction or interfered by other wireless signals to thereby become interrupted for a period of time, the base station 200 will detect records of interrupted communication and put a mark on the base-station backup file at each point of interrupted communication, so as to record all the interrupted points in the bidirectional wireless communication. When the bidirectional wireless communication between the wireless microphone 100 and the base station 200 resumes later, the base station 200 will inform the wireless microphone 100 to immediately use any remaining bandwidth after the voice data transmission to transmit the required data segments from the wireless microphone backup data in the wireless microphone 100 to the base station 200 for repairing the lost portions in the base-station backup file, so as to keep the base-station backup file complete and continuous and to insure the base-station database always keeps the most updated backup data. With these arrangements, it is able to avoid the risk of losing important information and data in the event the wireless microphone 100 is unexpectedly damaged or snatched by a gangster. Further, with the present invention, it is no longer necessary for a policeman before coming off duty to manually read data from the backup storage device 140*a* of the wireless microphone 100 into the base station 200, and this would largely reduce the policeman's work burden. The repaired base-station backup data file may be used to make up the evidencing voice data that is originally lost from the original video recording files, so that evidences supporting law enforcement may be well kept and stored to avoid future legal dispute in proceedings due to interrupted data at a critical time point.

When the data transmission between the wireless microphone 100 and the base station 200 does not indicate any interruption caused by any of the aforementioned factors or other factors, it means the base station 200 has already completely received all the data from the wireless microphone 100 and the complete data has been transmitted to and stored on the computer and database 900. In this case, the base-station backup data on the base station 200 and the wireless microphone backup data on the wireless microphone 100 would be marked as deletion allowed. Meanwhile, files that have been wireless transmitted would also be marked as deletion allowed. These deletion-allowed files will be overwritten by new data recorded later, allowing best utilization of the limited storage capacity of the storage device 140. Alternatively, when the bidirectional wireless transmission is done, the wireless microphone backup data on the backup storage device 140*a* may be read using a USB cable or by directly removing the backup storage device 140*a* from the wireless microphone 100.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A bidirectional wireless transmission and communication system, comprising:

- a base station comprising a base-station wireless transceiver module; and
- a wireless microphone comprising:
  - a wireless transceiver module performing a bidirectional wireless communication with the base-station wireless transceiver module;
  - a voice processing module receiving a first sound signal around the wireless microphone or outputting a second sound signal transmitted from the base station;
  - a storage device storing the first sound signal or the second sound signal; and
  - a microcontroller being connected to the wireless transceiver module, the voice processing module, and the storage device, and converting the first sound signal into a first RF signal for wirelessly transmitting to the base station;
- wherein when the bidirectional wireless communication between the base station and the wireless microphone is performed, the base station creates a base-station backup data stored in a database connected to the base station, and the wireless microphone creates a wireless microphone backup data stored in the storage device, and the base-station backup data and the wireless microphone backup data records the first sound signal and the second sound signal at the same time; and
- wherein when the bidirectional wireless communication is interrupted for a period of time and resumes later, the wireless microphone immediately transmits contents of the wireless microphone backup data within the interrupted period of time to the base station to complete the base-station backup data.

2. The bidirectional wireless transmission and communication system as claimed in claim 1, wherein the storage device further comprises a backup storage device for storing the wireless microphone backup data.

3. The bidirectional wireless transmission and communication system as claimed in claim 2, wherein when the bidirectional wireless communication is completed and ended, the wireless microphone backup data is read using a USB cable or removing the backup storage device from the wireless microphone directly.

4. The bidirectional wireless transmission and communication system as claimed in claim 1, wherein the wireless microphone further comprises a camera device and a display device, the camera device shooting images for displaying on the display device and the images being transmitted to the base station via the wireless transceiver module.

5. The bidirectional wireless transmission and communication system as claimed in claim 4, wherein the base station transmits the received images to a computer system having an image database for image matching to obtain an image matching result, and the image matching result being selectively transmitted back to the wireless microphone for displaying on the display device or transmitted via voice transmission to the voice processing module of the wireless microphone for outputting the image matching result.

* * * * *